United States Patent
Hummelgren et al.

(10) Patent No.: US 6,307,845 B1
(45) Date of Patent: Oct. 23, 2001

(54) PROCESSING PACKET-SWITCHED VOICE CALLS DIRECTED TO A MOBILE UNIT OPERATING IN CIRCUIT-SWITCHED MODE

(75) Inventors: Henrik Hummelgren, Solna; Dick Andersson, Kista; Torgny Karlsson, Bromma, all of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/028,267

(22) Filed: Feb. 23, 1998

(51) Int. Cl.[7] .............. H04Q 7/00; H04Q 7/20; H04J 3/24; H04J 3/16

(52) U.S. Cl. .......... 370/328; 370/329; 370/349; 370/469; 455/456; 455/458

(58) Field of Search ................ 370/328, 329, 370/349, 469, 355, 312, 310, 331, 338, 345, 419; 455/456, 458, 466, 556, 557, 422, 433, 435

(56) References Cited

U.S. PATENT DOCUMENTS

| | | | |
|---|---|---|---|
| H1641 | 4/1997 | Sharman | 379/60 |
| 5,327,486 | 7/1994 | Wolff et al. | 379/96 |
| 5,533,019 * | 7/1996 | Jayapalan | 370/60.1 |
| 5,559,611 | 9/1996 | Bloomfield et al. | 358/407 |
| 5,566,235 | 10/1996 | Hetz | 379/201 |
| 5,577,102 * | 11/1996 | Koivunen | 379/59 |
| 5,610,910 * | 3/1997 | Focsaneaunu et al. | 370/351 |
| 5,664,005 | 9/1997 | Emery et al. | 455/422 |
| 5,793,762 * | 8/1998 | Penners et al. | 370/389 |
| 5,901,142 * | 5/1999 | Averbuch et al. | 370/329 |
| 5,915,222 * | 6/1999 | Olsson et al. | 455/466 |
| 5,978,685 * | 11/1999 | Laiho | 455/466 |
| 6,122,263 * | 9/2000 | Dahlin et al. | 370/329 |

FOREIGN PATENT DOCUMENTS

| | | | |
|---|---|---|---|
| 0750439 | 12/1996 | (EP) | H04Q/7/38 |
| 0758175 | 2/1997 | (EP) | H04M/3/00 |
| 9726764 | 7/1997 | (WO) | H04Q/7/22 |

* cited by examiner

Primary Examiner—Wellington Chin
Assistant Examiner—M. Phan
(74) Attorney, Agent, or Firm—Jenkens & Gilchrist PC (57) ABSTRACT

A packet-switched voice call directed to a mobile subscriber unit in a cellular communication network is processed by determining whether the mobile subscriber unit is in a circuit-switched mode of operation and, if so, either forwarding the information in the packet-switched voice call to a destination other than the mobile subscriber unit or notifying the mobile subscriber unit that the packet-switched voice call is waiting.

37 Claims, 7 Drawing Sheets

PROCESSING PACKET-SWITCHED VOICE CALLS DIRECTED TO A MOBILE UNIT OPERATING IN CIRCUIT-SWITCHED MODE

BACKGROUND OF THE INVENTION

Figure 1:
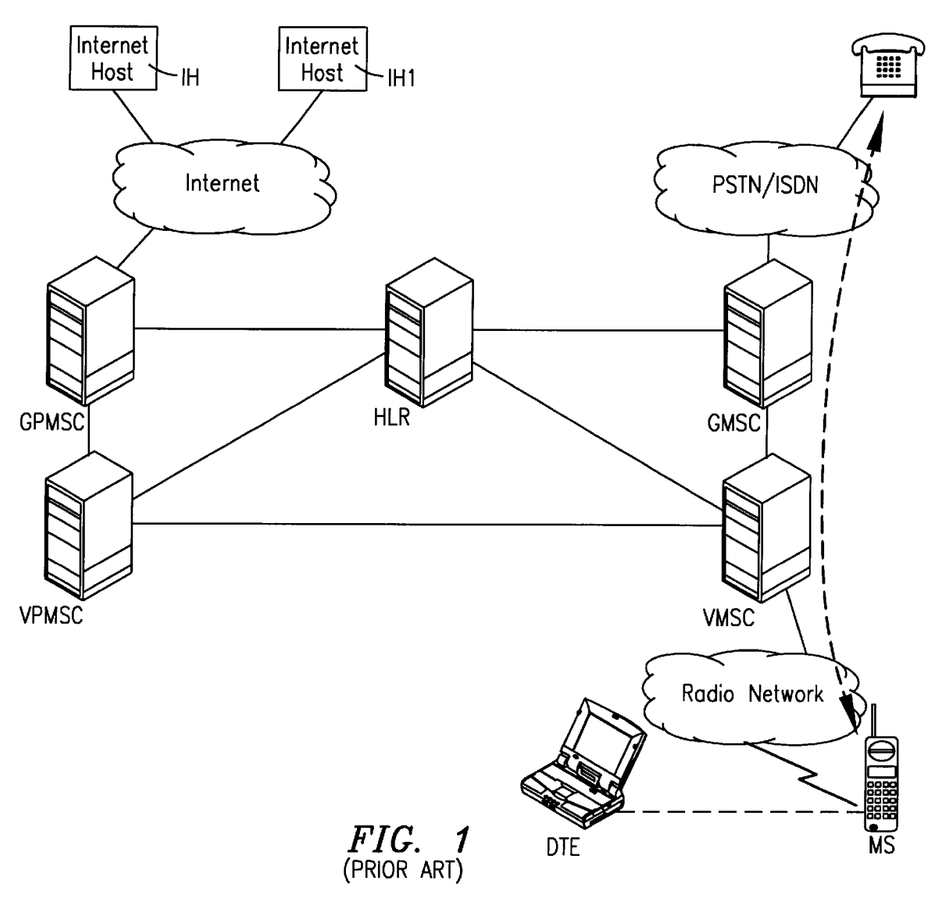
FIG. 1 illustrates a conventional cellular communication network.

FIG. 1 illustrates the architecture of a conventional cellular communication network, for example the Personal Digital Cellular system. The mobile station or mobile subscriber unit MS is capable of conducting both circuit-switched communication and packet-switched communication in the cellular network. Moreover, the cellular network supports voice communication via circuit-switched connections and via packet switching. The mobile subscriber unit typically has a permanent address, for example an Internet Protocol (IP) address which is known by the network. The data terminal equipment (DTE) attached to the mobile subscriber unit is configured with the IP address.

When the Gateway Packet Mobile Services Switching Center (GPMSC) receives an incoming IP voice packet from the Internet Host IH via the Internet, GPMSC checks with the home location register HLR and the Visited Mobile Services Switching Center VMSC to see if the mobile subscriber unit MS to which the IP voice packet is directed is already busy in a circuit-switched (CS) call. The HLR tells GPMSC whether or not the mobile subscriber unit is in the packet mode, and the VMSC tells the GPMSC whether the mobile subscriber unit is in CS mode or is idle. If it is determined that the mobile subscriber unit is already busy in a CS call, then the incoming IP voice packets directed to the mobile subscriber unit will be rejected. If, on the other hand, the mobile subscriber unit is not busy in a circuit-switched call, then the GPMSC sets up a packet channel to MS/DTE, and an IP voice session between the Internet Host IH and the mobile subscriber unit can be established.

Also shown in FIG. 1 are a Visited Packet Mobile Services Switching Center VPMSC, a Gateway Mobile Services Switching Center GMSC, a Public Switched Telephone Network PSTN, an Integrated Services Digital Network ISDN, and a radio network, all well known components of a conventional cellular network architecture.

Figure 2:
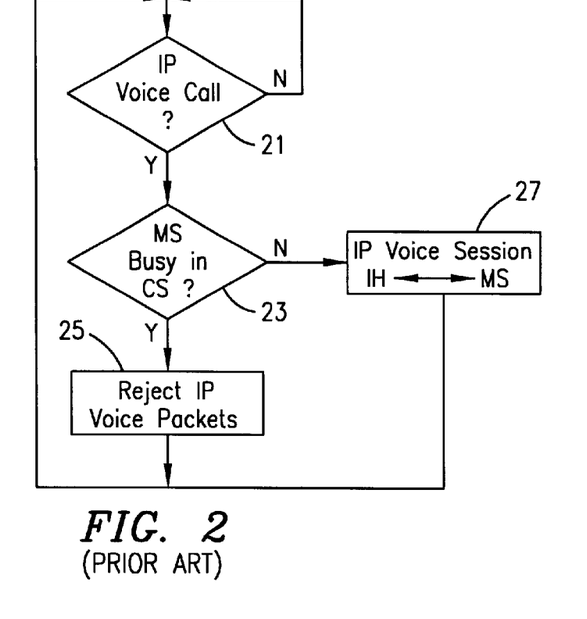
FIG. 2 illustrates operations performed by the GPMSC of FIG. 1.

The above-described conventional operation of the GPMSC is illustrated in FIG. 2. If an IP voice call is received at 21, it is determined at 23 whether or not the mobile station is busy in a circuit-switched call. If the mobile station is busy in a circuit-switched call, then the IP voice packets are rejected at 25. If the mobile station is not busy in a circuit-switched call at 23, then the GPMSC sets up a packet channel to MS/DTE, and an IP voice session between the Internet Host IH and the mobile subscriber unit can be established at 27.

It is desirable in view of the foregoing to process incoming packet-switched voice calls such that the voice packets are not rejected if the mobile subscriber unit to which they are directed is busy in a circuit-switched call.

According to the present invention, packet-switched voice calls directed to a mobile subscriber unit that is busy in a circuit-switched call are accommodated without rejecting the voice packets. Either the information in the packet switched voice call is forwarded to a destination other than the mobile subscriber unit, or the mobile subscriber unit is notified that the packet-switched voice call is waiting.

DETAILED DESCRIPTION

Figure 3:
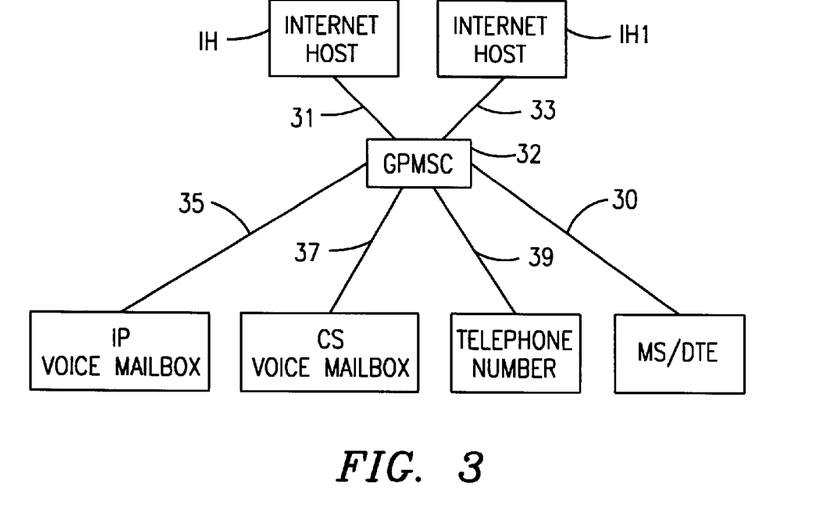
FIG. 3 is a block diagram which conceptually illustrates how a GPMSC according to the present invention processes packet-switched voice calls directed to a mobile subscriber unit that is busy in a circuit-switched call.

Example FIG. 3 is a block diagram which illustrates the routing of packet-switched voice calls by a GPMSC 32 according to the present invention. The communication links at 30, 31, 33, 35, 37 and 39 are illustrated conceptually for clarity of exposition. A packet-switched voice call is received at an input of GPMSC 32 via one of the communication links. The GPMSC 32 responds to receipt of the call by providing at an output thereof a suitable communication to be carried, for example, by one of the communication links to one of the components shown in FIG. 3. Workers in the art will readily comprehend from the following description the actual routing of communications in FIG. 3.

Figure 4:
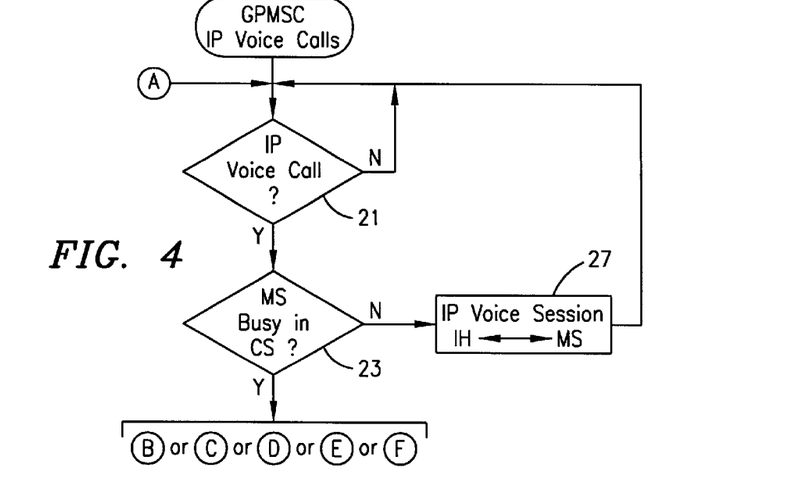
FIG. 4 illustrates the operation of the GPMSC of FIG. 3 when it receives a packet-switched voice call directed to a mobile subscriber unit.

Referencing also exemplary FIG. 4, if at 21 the GPMSC 32 receives at an input thereof a packet-switched voice call (in this example an IP voice call from Internet Host IH), it is first determined at 23 whether or not the mobile subscriber unit is busy in a circuit-switched call. If not, then at 27 the GPMSC 32 sets up a packet channel to MS/DTE, and an IP voice session between the Internet Host IH and the mobile subscriber unit can be established. This voice session is conducted via the GPMSC 32 and the communication links 31 and 30. It will be noted that the operations at 21, 23 and 27 in FIG. 4 are the same as the correspondingly numbered operations in prior art FIG. 2. Thus, when the mobile subscriber unit is not busy in a circuit-switched call, the GPMSC 32 responds to an incoming packet-switched voice call in the same manner as the prior art GPMSC described above with respect to exemplary FIGS. 1 and 2.

If at 23 the mobile subscriber unit is busy in a circuit-switched call, then the GPMSC 32 can respond by executing any one of five exemplary procedures designated at B, C, D, E and F in FIG. 4.

Figure 5:
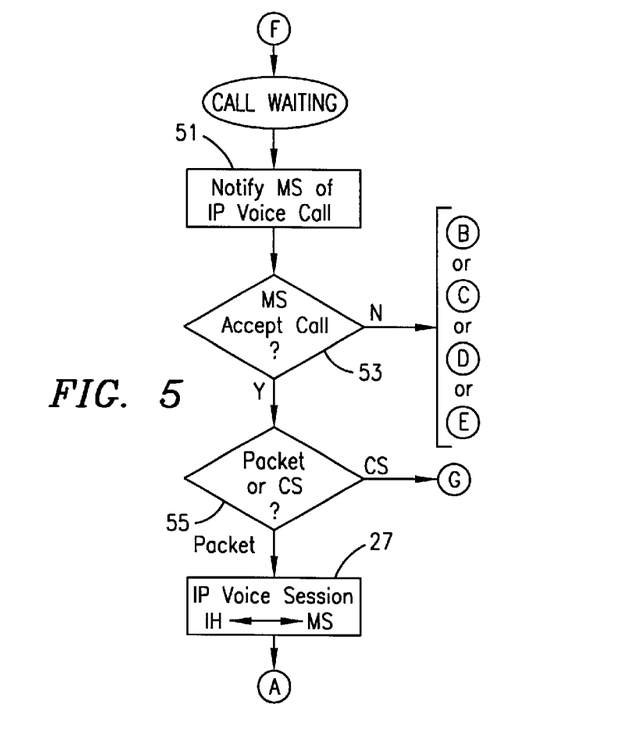
FIG. 5 illustrates one exemplary response of the GPMSC when the mobile subscriber unit is busy in FIG. 4.

The exemplary procedure designated at F in FIG. 4 is the call waiting procedure of FIG. 5. At 51 in the call waiting procedure, the GPMSC 32 notifies the mobile subscriber unit of the IP voice call. Use of a call-waiting notification is well known in the art. It is advantageous, however, to provide at the mobile subscriber unit a unique indication (e.g. audible) that enables the user to determine that the waiting call is a packet-switched voice call. The user of the mobile subscriber unit determines whether or not to accept the IP voice call. The decision of the user is transmitted to the GPMSC, and the GPMSC determines at 53 whether or not the user of the mobile subscriber unit has accepted the IP voice call. If not, then the GPMSC executes any one of the aforementioned procedures designated at B, C, D and E. If the user of the mobile subscriber unit accepts the IP call at 53, it is then determined at 55 whether the mobile subscriber unit has chosen to receive the IP voice call in circuit-switched mode or in packet-switched mode.

If circuit-switched mode is selected at 55, then the GPMSC executes the exemplary procedure designated at G in FIG. 5. If packet-switched mode is selected, then the GPMSC sets up a packet channel to MS/DTE, and an IP voice session between the Internet Host IH and the mobile subscriber unit can be established (27). It will be noted that the IP voice session conducted at 27 in FIG. 5 can be the same as the conventional IP voice session illustrated in FIGS. 2 and 4. After the IP voice session is completed at 27, the call waiting procedure of FIG. 5 proceeds to point A of FIG. 4 and thus re-enters the decision block 21 of FIG. 4.

Figure 6:
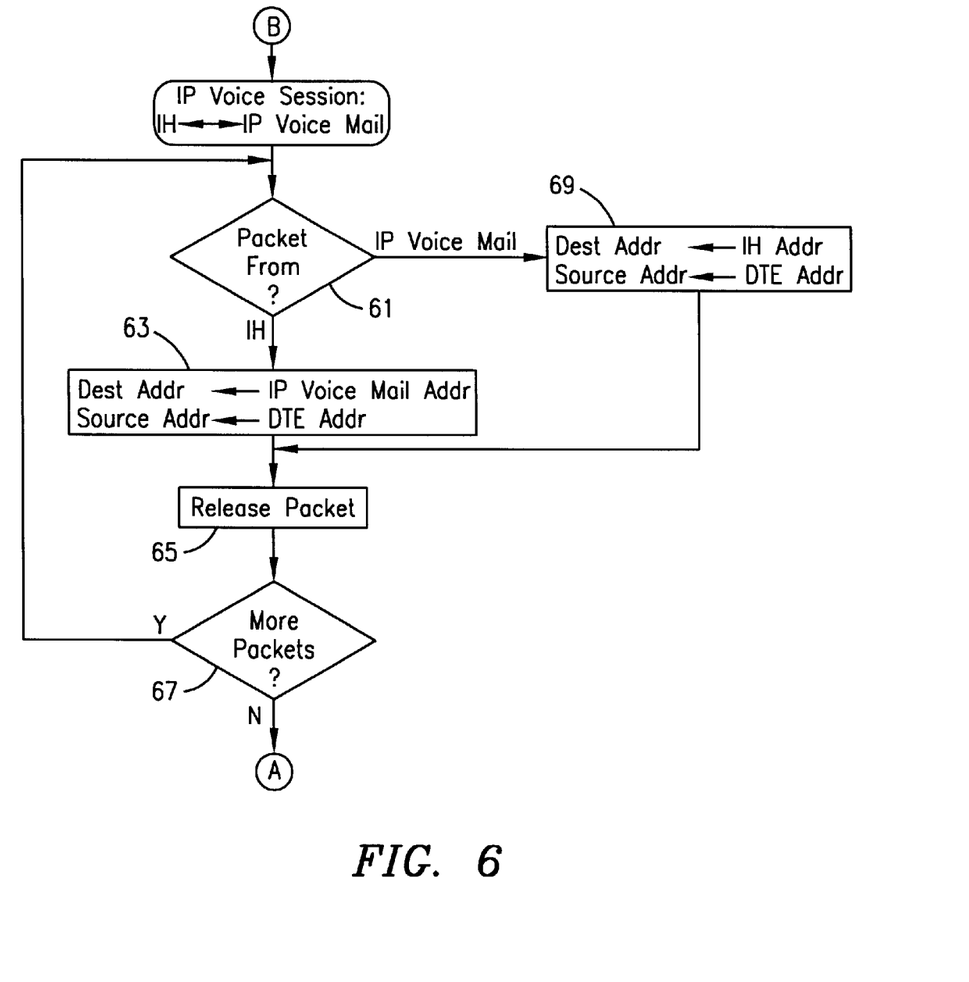
FIG. 6 illustrates one exemplary response of the GPMSC when the mobile subscriber unit is busy in FIG. 4 or does not accept the call in FIG. 5.

Exemplary FIG. 6 illustrates the procedure designated at B in FIGS. 4 and 5. This procedure can be executed by GPMSC 32 when the mobile subscriber unit is busy in a circuit-switched call at 23 in FIG. 4 or when the mobile subscriber unit does not accept the IP voice call at 53 in FIG. 5. The procedure designated at B in FIGS. 4–6 is operative to set up and conduct an IP voice session between the Internet Host IH and an IP voice mailbox (see FIG. 3). In FIG. 6, the GPMSC alters the source and destination addresses in the IP voice packets that are exchanged between the Internet Host IH and the IP voice mailbox.

If it is determined at 61 that a packet arriving at the GPMSC 32 is from the Internet Host IH, then at 63 the GPMSC changes the destination address in that packet to the address of the IP voice mailbox, and also changes the source address of that packet to the address of DTE. It will be noted that the destination address which is received from the Internet Host IH, and which is changed at 63 to the IP voice mailbox address, is the DTE address. It will likewise be noted that the source address which is received from the Internet Host IH, and which is replaced at 63 by the DTE address, is the address of the Internet Host IH. The destination address is changed to the IP voice mailbox address so that the packet is routed to the IP voice mailbox, and the source address is changed to the DTE address because the IP voice mailbox needs this address for identification of the mobile user. After the source address and destination address are changed at 63, the packet is released at 65.

It is thereafter determined at 67 whether there are any more packets in the IP voice session. If so, then control returns to decision block 61. If not, then control proceeds to point A of FIG. 4 and thus re-enters decision block 21 of FIG. 4. If the GPMSC receives a packet from the IP voice mailbox at 61, then at 69 the GPMSC 32 changes the destination address of that packet to the address of the Internet Host IH, and also changes the source address of that packet to the DTE address. It will be noted that a packet received at GPMSC 32 from the IP voice mailbox would have the DTE address for a destination address, and would have the IP voice mailbox address as a source address. These addresses supplied by the IP voice mailbox are changed at 69 in order to facilitate the IP voice session between the IP voice mailbox and the Internet Host IH. After the addresses are changed at 69, the packet is released at 65 as described above.

It will be recognized from the foregoing description of FIG. 6 that GPMSC acts as a proxy server, translating the IP source and destination addresses. The packets received from the Internet Host IH have their destination addresses changed to permit them to be rerouted to the IP voice mailbox (instead of DTE), and also have their source addresses changed in order to permit the IP voice mailbox to identify them as packets associated with DTE. According to the invention, the IP voice mailbox may include, for example, a look-up table including the MS/DTE addresses of all mobile stations that use the IP voice mailbox. When the IP voice mailbox receives a voice packet, it can first compare the source address of the packet to the MS/DTE address entries in the table. If a matching MS/DTE address is found in the table, then the IP voice mailbox stores the packet in the mailbox associated with the matched MS/DTE address. If no match is found, the IP voice mailbox discards the packet. It should also be noted that the IP voice mailbox should preferably be physically closely connected to GPMSC 32, for example, closely enough that packets exchanged therebetween would not need to traverse the Internet.

It will also be appreciated that packets received at GPMSC from the IP voice mailbox have their destination addresses changed to permit them to be rerouted to the Internet Host IH (instead of DTE), and have their source addresses changed in order to permit the Internet Host IH to accept them as packets from DTE. The GPMSC 32 makes it appear to the IP voice mailbox that packets from the Internet Host IH are instead from DTE, and also makes it appear to the Internet Host IH that packets from the IP voice mailbox are instead from DTE. This address mapping operation facilitates the IP voice session between the Internet Host IH and the IP voice mailbox.

Figure 7:
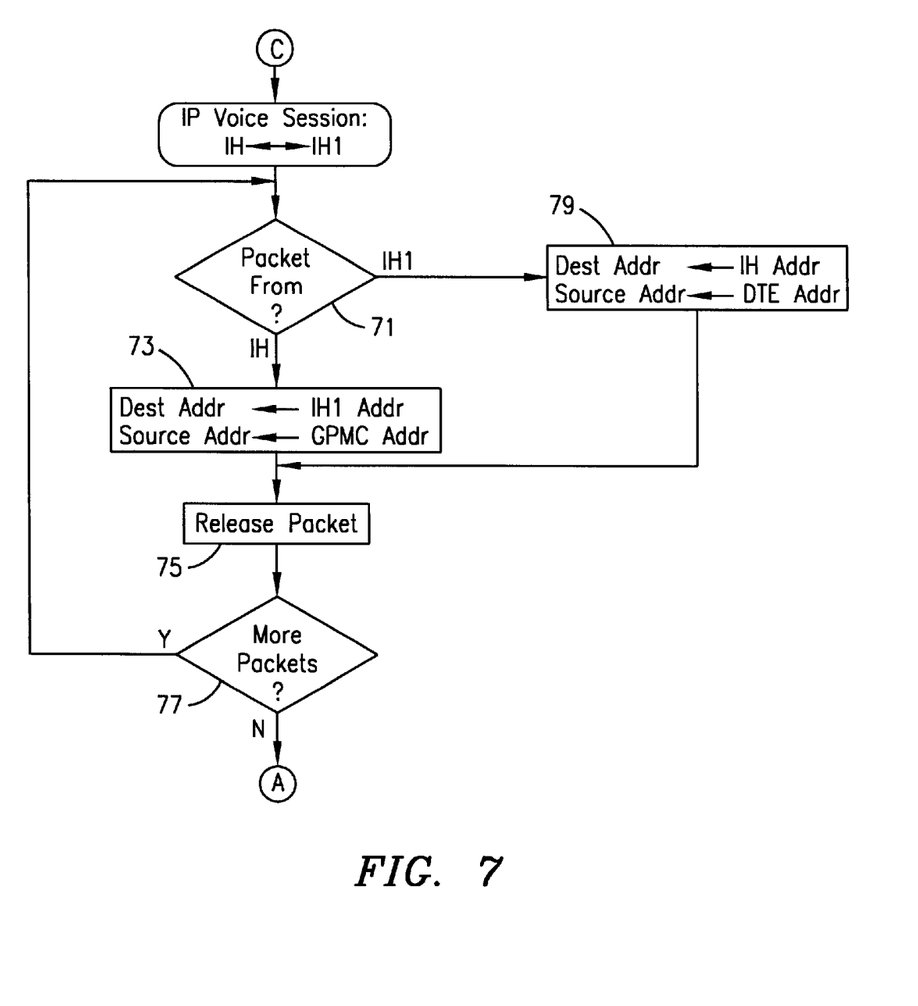
FIG. 7 illustrates another exemplary response of the GPMSC when the mobile subscriber unit is busy in FIG. 4 or does not accept the call in FIG. 5.

FIG. 7 illustrates another exemplary response of the GPMSC 32 when the mobile subscriber unit is busy at 23 in FIG. 4 or when the mobile subscriber unit does not accept the IP voice call at 53 in FIG. 5. The procedure in FIG. 7 is designated at C in FIGS. 4, 5 and 7. In FIG. 7, the GPMSC 32 sets up and conducts an IP voice session between the Internet Host IH and the Internet Host IH1 (see FIG. 3). If a packet is received from the Internet Host IH at 71, then the destination address and source address of that packet are changed at 73. In particular, the destination address of the packet is changed to the address of Internet Host IH1, and the source address of the packet is changed to the address of GPMSC 32. It will be noted that the destination address as originally received from the Internet Host IH would have been the DTE address, and the source address would have been the address of the Internet Host IH. After the addresses are changed at 73, the packet is released at 75. Thereafter at 77, the GPMSC determines whether or not there are any more packets to be routed in the IP voice session. If so, then the procedure re-enters decision block 71. If not, then the procedure moves to point A in FIG. 4 to re-enter decision block 21 of FIG. 4.

Packets received from Internet Host IH1 at 71 have their destination and source addresses changed at 79. More specifically, the destination address of such packets is changed to the address of the Internet Host IH, and the source address of such packets is changed to the address of DTE. It will be noted that the destination address of packets as received from Internet Host IH1 would be the address of GPMSC 32 and the source address of such packets would be the address of Internet Host IH1. After the addresses are changed at 79, the packet is released at 75 as described above.

It will be appreciated that the GPMSC acts as a proxy server in FIG. 7, translating the IP addresses. By changing the addresses at 73 in FIG. 7, the GPMSC 32 permits packets sent from Internet Host IH to DTE to be redirected by GPMSC to Internet Host IH1. The changing of addresses at 79 permits packets sent from the Internet Host IH1 to the GPMSC 32 to be forwarded from the GPMSC 32 to the Internet Host IH and to appear as though they originated at DTE. Thus, the address mapping procedures at 73 and 79 enable the GPMSC to conduct an IP voice session between the Internet Host IH and the Internet Host IH1.

Figure 8:
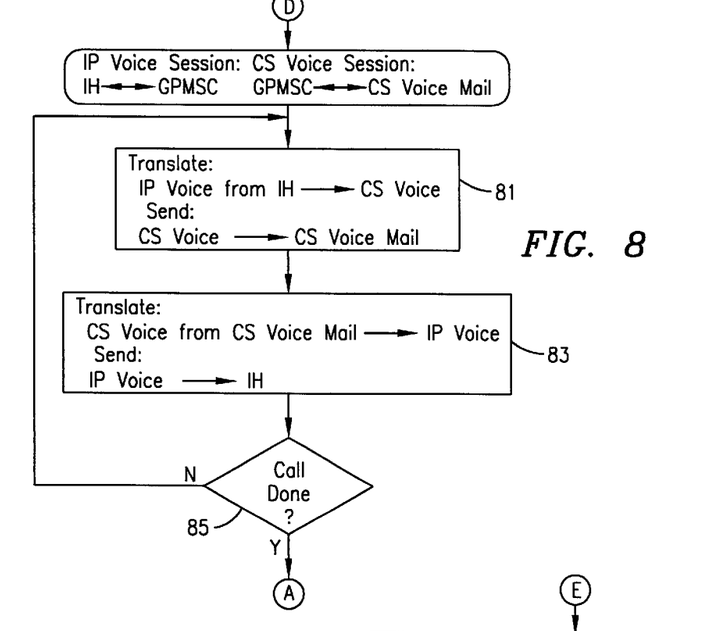
FIG. 8 illustrates another exemplary response of the GPMSC when the mobile subscriber unit is busy in FIG. 4 or does not accept the call in FIG. 5.

FIG. 8 illustrates another example response of the GPMSC when the mobile subscriber unit is busy at 23 in FIG. 4 or the mobile subscriber unit does not accept the IP voice call at 53 in FIG. 5. The procedure illustrated in FIG. 8 is designated at D in FIGS. 4, 5 and 8. In FIG. 8, the GPMSC sets up and conducts a conventional IP voice session between the Internet Host IH and the GPMSC, and also sets up and conducts a conventional CS voice session between the GPMSC and a conventional circuit-switched (CS) voice mailbox (see FIG. 3).

At 81 in FIG. 8, the GPMSC 32 translates or converts the IP voice packets received from the Internet Host IH into circuit-switched voice signals. The GPMSC sends the CS voice signals to the CS voice mailbox. At 83, the GPMSC 32 translates or converts CS voice signals received from the CS voice mailbox into IP voice packets, and sends the IP voice packets to the Internet Host IH. It will be recognized from the procedures at 81 and 83 that the GPMSC 32 operates in FIG. 8 as a conventional IP Voice Gateway. If the call is not finished at 85, then the procedure returns to re-enter block 81. If the call is finished at 85, then the procedure moves to point A in FIG. 4 to re-enter decision block 21 of FIG. 4.

Figure 9:
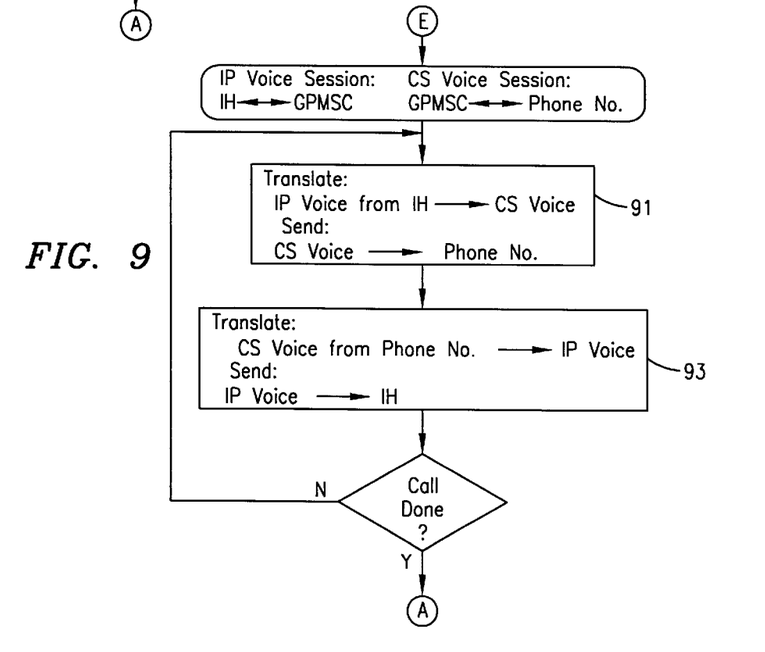
FIG. 9 illustrates another exemplary response of the GPMSC when the mobile subscriber unit is busy in FIG. 4 or does not accept the call in FIG. 5.

FIG. 9 illustrates another example response of the GPMSC 32 when the mobile subscriber unit is busy at 23 in FIG. 4 or the mobile subscriber unit does not accept the IP voice call at 53 in FIG. 5. The procedure of FIG. 9 is designated at E in FIGS. 4, 5 and 9. In FIG. 9, the GPMSC 32 sets up and conducts an IP voice session between the Internet Host IH and the GPMSC, and also sets up and conducts a CS voice session between the GPMSC and a conventional telephone number (see FIG. 3). The procedures at 91 and 93 in FIG. 9 are analogous to the procedures at 81 and 83 in FIG. 8, the CS voice session in FIG. 9 being conducted between the GPMSC and the telephone number rather than between the GPMSC and the CS voice mailbox as in FIG. 8. The communication link 39 between GPMSC 32 and the telephone number can include, for example, a PSTN or ISDN network or a radio network (see FIG. 1).

Figure 10:
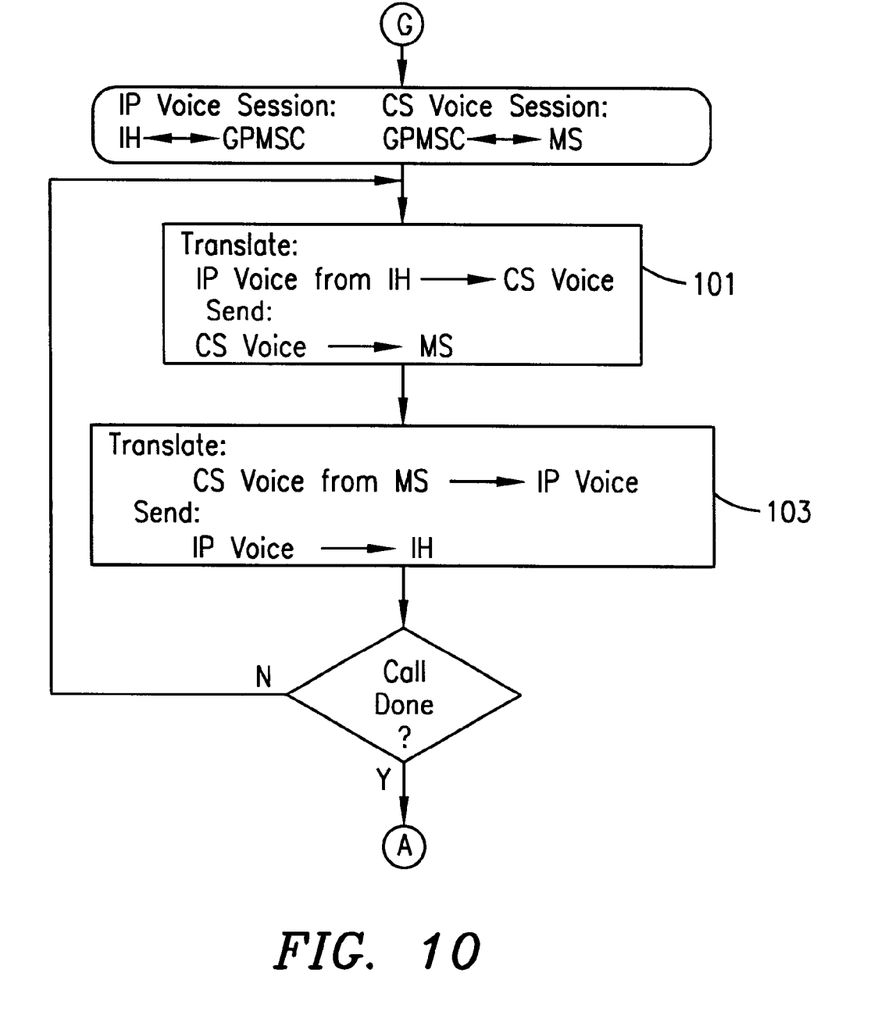
FIG. 10 illustrates one exemplary response of the GPMSC when the mobile subscriber unit accepts the call in FIG. 5 in circuit-switched mode.

FIG. 10 illustrates an example of the response of the GPMSC 32 when the mobile subscriber unit accepts the IP voice call but chooses the CS mode in FIG. 5. The procedure in FIG. 10 is designated at G in FIGS. 5 and 10. In FIG. 10, the GPMSC sets up and conducts an IP voice session between the Internet Host IH and the GPMSC, and also sets up and conducts a CS voice session between the GPMSC and the mobile subscriber unit MS. The procedures indicated at 101 and 103 in FIG. 10 are analogous to those indicated at 81 and 83 in FIG. 8 and those indicated at 91 and 93 in FIG. 9, the CS voice session in FIG. 10 being conducted between the GPMSC and the mobile subscriber unit MS.

It will thus be appreciated that the GPMSC 32 acts in FIG. 8 as a conventional IP Voice Gateway between the Internet Host IH and the CS voice mailbox, and acts in FIG. 9 as a conventional IP Voice Gateway between the Internet Host IH and the telephone number, and acts in FIG. 10 as a conventional IP Voice Gateway between the Internet Host IH and the mobile subscriber unit MS/DTE.

According to the foregoing description, an IP voice call received from Internet Host IH and directed to the mobile subscriber unit MS and data terminal equipment DTE at MS/DTE can be redirected to an IP Voice Mailbox (FIG. 6) or to another Internet Host IH1 (FIG. 7). Further, the GPMSC can be operated as an IP Voice Gateway between the Internet Host IH and a circuit-switched voice mailbox (FIG. 8) or between the Internet Host IH and a telephone number (FIG. 9). In each of FIGS. 6–9, the information in an IP voice call directed to the mobile subscriber unit is redirected or forwarded instead to a destination other than the mobile subscriber unit. These redirecting operations of FIGS. 6–9 may be employed when the mobile subscriber unit is busy at 23 in FIG. 4 or when the mobile subscriber unit does not accept the IP voice call at 53 in FIG. 5.

If the call waiting procedure of FIG. 5 is executed after determining that the mobile station is busy at 23 in FIG. 4, then any of the operations of FIGS. 6–9 may be selected if the mobile subscriber unit does not accept the IP voice call at 53. If the IP voice call is accepted at 53, and if the mobile subscriber unit chooses the circuit-switched mode, then the GPMSC 32 acts as an IP Voice Gateway between the Internet Host IH and the mobile subscriber unit MS/DTE as illustrated in FIG. 10. If the IP voice call is accepted for packet mode delivery at 55, then a conventional IP voice session is set up and conducted between IH and MS/DTE.

The present invention thus provides for processing a packet-switched voice call when the mobile subscriber unit is busy in a circuit-switched voice call, and does not require rejection of the packet-switched voice call.

All IP voice sessions described above are set up using well-known conventional techniques such as described in ITU-T (Telecommunication Standardization Sector of the International Telecommunication Union) Recommendation H.323 (11/96), which is hereby incorporated herein by reference. All CS voice sessions described above are readily set up using well-known conventional telephony techniques such as promulgated by ITU-T.

It will be evident to workers in the art that GPMSC 32 of FIGS. 3–10 can, in one example approach, be readily realized by appropriately modifying the software in the conventional GPMSC of FIGS. 1–2. Other suitable combinations of hardware and software modifications in the conventional GPMSC will also suffice to realize GPMSC 32, as will be evident to workers in the art in view of the foregoing description.

Although exemplary embodiments of the present invention have been described above in detail, this does not limit the scope of the invention, which can be practiced in a variety of embodiments.

What is claimed is:

1. A method of processing a packet-switched voice call directed to a mobile subscriber unit in a cellular communication network, comprising:

determining that the mobile subscriber unit is in a circuit-switched mode of operation; and forwarding the information in the packet-switched voice call to a destination other than the mobile subscriber unit, wherein said forwarding step includes conducting a packet-switched voice session between a source of the packet-switched voice call and the destination and wherein said conducting step includes changing a source address of a voice packet that is en route from the source to the destination.

2. The method of claim 1, wherein said forwarding step includes forwarding the packet-switched voice call to a packet-switched voice mailbox.

3. The method of claim 1, wherein said forwarding step includes forwarding the information in the packet-switched voice call to a circuit-switched voice mailbox.

4. The method of claim 1, wherein said forwarding step includes forwarding the packet-switched voice call to an Internet Host.

5. The method of claim 1, wherein said forwarding step includes forwarding the information in the packet-switched voice call to a telephone number.

6. The method of claim 1, wherein said forwarding step includes conducting a packet-switched voice session between a source of the packet-switched voice call and a GPMSC, and conducting a circuit-switched voice session between the GPMSC and the destination.

7. The method of claim 6, wherein said last-mentioned conducting step includes using the GPMSC to convert the packet-switched voice call into a circuit-switched voice call.

8. The method of claim 7, wherein the destination is a circuit-switched voice mailbox.

9. The method of claim 7, wherein the destination is a telephone number.

10. The method of claim 7, wherein the source is an Internet Host.

11. The method of claim 1, wherein said conducting step includes changing a destination address of a voice packet that is en route from the source to the destination.

12. The method of claim 1, wherein said conducting step includes changing a destination address of a voice packet that is en route from the source to the destination.

13. The method of claim 12, wherein said changing steps include using a GPMSC to change the addresses.

14. The method of claim 13, wherein the source is an Internet Host.

15. The method of claim 14, wherein the destination is a packet-switched voice mailbox.

16. The method of claim 14, wherein the destination is a further Internet Host.

17. The method of claim 1, wherein said conducting step includes changing a destination address of a voice packet that is en route from the destination to the source.

18. The method of claim 1, wherein said conducting step includes changing a source address of a voice packet that is en route from the destination to the source.

19. The method of claim 18, wherein said conducting step includes changing a destination address of a voice packet that is enroute from the destination to the source.

20. The method of claim 19, wherein said changing steps include using a GPMSC to change the addresses.

21. The method of claim 20, wherein the source is an Internet Host.

22. The method of claim 21, wherein the destination is a packet-switched voice mailbox.

23. The method of claim 21, wherein the destination is a further Internet Host.

24. A method of processing a packet-switched voice call directed to a mobile subscriber unit in a cellular communication network, comprising:

determining that the mobile subscriber unit is in a circuit-switched mode of operation;

notifying the mobile subscriber unit of the packet-switched voice call;

determining that the mobile subscriber unit has rejected the packet-switched voice call;

forwarding the information in the packet-switched voice call to a destination other than the mobile subscriber unit; and conducting a packet-switched voice session between a source of the packet-switched voice call and the destination, said conducting step includes changing a source address of a voice packet that is en route from the source to the destination.

25. The method of claim 24, including determining that the mobile subscriber unit has accepted the packet-switched voice call, and thereafter conducting a packet-switched voice session between the mobile subscriber unit and a source of the packet-switched voice call.

26. The method of claim 24, including determining that the mobile subscriber unit has accepted the packet-switched voice call, and thereafter converting the packet-switched voice call into a circuit-switched voice call to the mobile subscriber unit.

27. The method of claim 26, wherein said converting step includes receiving voice packets at a GPMSC, and outputting from the GPMSC the circuit-switched voice call to the mobile subscriber unit.

28. The method of claim 24, wherein said forwarding step includes forwarding the packet-switched voice call to a packet-switched voice mailbox.

29. The method of claim 24, wherein said forwarding step includes forwarding the information in the packet-switched voice call to a circuit-switched voice mailbox.

30. The method of claim 24, wherein said forwarding step includes forwarding the packet-switched voice call to an Internet Host.

31. The method of claim 24, wherein said forwarding step includes forwarding the information in the packet-switched voice call to a telephone number.

32. The method of claim 1, wherein the packet-switched voice call is an IP voice call.

33. The method of claim 24, wherein the packet-switched voice call is an IP voice call.

34. A switching apparatus for processing information in a packet-switched voice call directed to a mobile subscriber unit of a cellular communication network, comprising:

an input for receiving the packet-switched voice call;

a further input for receiving information indicative of whether the mobile subscriber unit is busy in a circuit-switched voice call; and an output through which the information in the packet-switched voice call is forwarded to a destination other than the mobile subscriber unit if the mobile subscriber unit is busy in a circuit-switched voice call, wherein said output is further operable to conduct a packet-switched voice session between a source of the packet-switched voice call and the destination and wherein said switching apparatus is adapted to change a source address of a voice packet that is en route from the source to the destination.

35. The apparatus of claim 34, wherein the packet-switched voice call is an IP voice call.

36. A switching apparatus for processing information in a packet-switched voice call directed to a mobile subscriber unit of a cellular communication network, comprising:

an input for receiving the packet-switched voice call;

a further input for receiving information indicative of whether the mobile subscriber unit is busy in a circuit-switched voice call; and an output through which the mobile subscriber unit is notified that the packet-switched voice call is waiting if the mobile subscriber unit is busy in a circuit-switched voice call, wherein said output is further operable to conduct a packet-switched voice session between a source of the packet-switched voice call and the destination and wherein said switching apparatus is adapted to change a source address of a voice packet that is en route from the source to the destination.

37. The apparatus of claim 36, wherein the packet-switched voice call is an IP voice call.

* * * * *

UNITED STATES PATENT AND TRADEMARK OFFICE
CERTIFICATE OF CORRECTION

PATENT NO. : 6,307,845 B1
DATED : October 23, 2001
INVENTOR(S) : Hummelgren et al.

It is certified that error appears in the above-identified patent and that said Letters Patent is hereby corrected as shown below:

<u>Column 1,</u>
Line 3, insert -- FIELD OF INVENTION

This invention relates generally to routing of communications in a cellular communication network and, more particularly, to routing of packet-switched voice calls directed to a mobile subscriber unit in a cellular communication network. --

Signed and Sealed this

Twenty-third Day of July, 2002

Attest:

Attesting Officer

JAMES E. ROGAN
*Director of the United States Patent and Trademark Office*